(12) United States Patent
Liu et al.

(10) Patent No.: US 9,880,610 B2
(45) Date of Patent: Jan. 30, 2018

(54) POWER SUPPLYING METHOD, POWER SUPPLYING SYSTEM, AND ELECTRONIC DEVICE

(71) Applicants: BEIJING LENOVO SOFTWARE LTD., Beijing (CN); LENOVO (BEIJING) LIMITED, Beijing (CN)

(72) Inventors: Dongzhe Liu, Beijing (CN); Wei Liu, Beijing (CN); Yuanyuan Wu, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 149 days.

(21) Appl. No.: 14/840,725

(22) Filed: Aug. 31, 2015

(65) Prior Publication Data

US 2016/0320828 A1    Nov. 3, 2016

(30) Foreign Application Priority Data

Apr. 29, 2015   (CN) .......................... 2015 1 0213818

(51) Int. Cl.
*G06F 1/32* (2006.01)
*G06F 1/14* (2006.01)

(52) U.S. Cl.
CPC .............. *G06F 1/3287* (2013.01); *G06F 1/14* (2013.01); *G06F 1/3212* (2013.01); *G06F 1/3296* (2013.01)

(58) Field of Classification Search
None
See application file for complete search history.

(56) References Cited

U.S. PATENT DOCUMENTS 8,487,655 B1 * 7/2013 Kutz ...................... G06F 13/28
                                                              326/82
2008/0235528 A1 * 9/2008 Kim ...................... G06F 1/3225
                                                              713/324

(Continued)

FOREIGN PATENT DOCUMENTS

CN            102841668 A        12/2012

*Primary Examiner* — Paul J Yen
(74) *Attorney, Agent, or Firm* — Scully Scott Murphy & Presser (57) ABSTRACT

The present disclosure discloses a power supplying method, a power supplying system, and an electronic device to address the technical problems in the related art that the structure of an electronic device is complex, thereby achieving the technical effect that the internal structure of an electronic device is simplified and the cost for manufacturing the electronic device is reduced. The method comprises: detecting and acquiring current voltage of a power supplying battery in an electronic device as a first voltage if the power supplying battery is in a first power supplying state where a first operational circuit comprising a Real-Time Clock (RTC) and a second operational circuit are supplied with power, wherein the power supplying battery is connected to the first operational circuit and the second operational circuit via a regulator, and wherein the second operational circuit is a power-on circuit comprising a power switch; determining whether the first voltage is lower than a preset voltage to acquire a determination result; and controlling the power supplying battery to switch from the first power supplying state to a second power supplying state where only the first operational circuit is supplied with power if the determination result is yes.

8 Claims, 2 Drawing Sheets

(56) References Cited

U.S. PATENT DOCUMENTS

| | | | | |
|---|---|---|---|---|
| 2009/0037755 A1* | 2/2009 | Nakano | ................ | G06F 1/3203 713/322 |
| 2010/0210322 A1* | 8/2010 | Kim | ....................... | G06F 1/263 455/574 |

* cited by examiner

POWER SUPPLYING METHOD, POWER SUPPLYING SYSTEM, AND ELECTRONIC DEVICE

CROSS-REFERENCE TO RELATED APPLICATION(S)

This application claims priority to Chinese Application No. 201510213818.6, filed on Apr. 29, 2015, both of which are incorporated herein by reference in their entirety.

TECHNICAL FIELD

The present disclosure relates to the field of electronic technology, and in particular, to a power supplying method, a power supplying system, and an electronic device.

BACKGROUND

With rapid development of science and technology and highly competitive market, performance and appearance of an electronic device is highly improved. Among others, notebook computers are becoming increasingly popular due to their advantages, such as compact size, portability, and high entertainment, and they have become an indispensible part in daily life. A user may have increasingly more things to do with a tablet computer having a communication function than ever. For example, with a tablet computer having a communication function, a user may communicate with others, watch videos, play games, or the like.

Currently, in order to have a correct system time in an electronic device, it usually requires an RTC (Real-Time Clock) battery, such as a button cell, provided for an RTC circuit in the electronic device. A clock frequency used for calculating time and energy used for storing time information and integrated circuit settings may be provided to the electronic device by this RTC battery, so as to guarantee a normal clock frequency for the electronic device. For example, if the notebook computer is in a switched-off state, with the separately provided button cell supplying power to the RTC circuit in the chip of the notebook computer, the system clock may be consistent with a standard clock when the notebook is turned on, and no manual operations of the user for setting the system time is required. In most cases, a button cell may keep supplying power to an RTC circuit for one year. However, due to the trend that an electronic device is becoming increasingly thinner and lighter, its internal space is becoming increasingly limited. An RTC battery that is dedicated to supply power to an RTC circuit will occupy the internal space of an electronic device, and therefore the difficulty in design as well as the cost for manufacturing the electronic device are increased.

Based thereon, it is a technical problem in the related art that the structure of an electronic device is complex.

SUMMARY

According to embodiments of the present disclosure, a power supplying method, a power supplying system, and an electronic device are provided in this disclosure.

In a first aspect of the present disclosure, a power supplying method is provided. The method comprises: detecting current voltage of a power supplying battery in an electronic device when the power supplying battery is in a first power supplying state where a first operational circuit comprising a Real-Time Clock (RTC) and a second operational circuit are both supplied with power, wherein the power supplying battery is connected to the first operational circuit and the second operational circuit via a regulator, and wherein the second operational circuit is a power-on circuit comprising a power switch; determining whether the detected current voltage is lower than a preset voltage; and controlling the power supplying battery to switch from the first power supplying state to a second power supplying state where only the first operational circuit is supplied with power in case that the detected current voltage is lower than the preset voltage.

In a second aspect of the present disclosure, a power supplying system is provided. The power supplying system comprises: a power supplying battery configured to supply the electronic device with the power supply voltage; a regulator connected to the power supplying battery and configured to convert the power supply voltage into a stable operating voltage; a first operational circuit and a second operational circuit connected to the power supplying battery via the regulator, the first operational circuit comprising a Real-Time Clock (RTC) circuit, and the second operational circuit being a power-on circuit, wherein the power supplying battery is controlled to switch from a first power supplying state to a second power supplying state if it is detected that a current voltage of the power supplying battery is lower than a preset voltage, where in the first power supplying state, the first operational circuit and the second operational circuit are both supplied with power, while in the second power supplying state, only the first operational circuit is supplied with power.

In a third aspect of the present disclosure, an electronic device is provided, The electronic device comprises the above described power supplying system.

DETAILED DESCRIPTION

According to embodiments of the present disclosure, a power supplying method, a power supplying system, and an electronic device are provided to address the technical problems in the related art that the structure of an electronic device is complex and the internal space utilization is low, thereby achieving the technical effect that the internal structure of an electronic device is simplified and the cost for manufacturing the electronic device is reduced.

A power supplying method comprises: detecting and acquiring current voltage of a power supplying battery in an electronic device as a first voltage if the power supplying battery is in a first power supplying state where a first operational circuit comprising a Real-Time Clock (RTC) and a second operational circuit are supplied with power, wherein the power supplying battery is connected to the first operational circuit and the second operational circuit via a regulator, and wherein the second operational circuit is a power-on circuit comprising a power switch; determining whether the first voltage is lower than a preset voltage to acquire a determination result; and controlling the power supplying battery to switch from the first power supplying state to a second power supplying state where only the first operational circuit is supplied with power if the determination result is yes.

In order to illustrate the objects and solutions of the embodiments of the present disclosure in a clearer manner, a detailed and thorough description of the technical solutions of the embodiments of the present disclosure will be given below with reference to the drawings of the embodiments of the present disclosure. Obviously, the described embodiments are some but not all of the embodiments of the present disclosure. Based on the embodiments of the present disclosure, all other embodiments contemplated by one ordinarily skilled in the art without any inventive effort may fall into the scope of the present disclosure.

In the embodiments of the present disclosure, the electronic device may be any electronic device, such as a notebook, a PAD (tablet computer), a smartphone, and the present disclosure is not limited thereto.

Further, the term "and/or" used herein only is a term that is used to describe a relationship between the objects, and it covers three relationships. For example, A and/or B may represents: A alone, both A and B, and B alone. Further, the symbol "/" used herein usually indicates a relationship of "OR" between the object preceding the "/" and the object following the "/".

Figure 1:
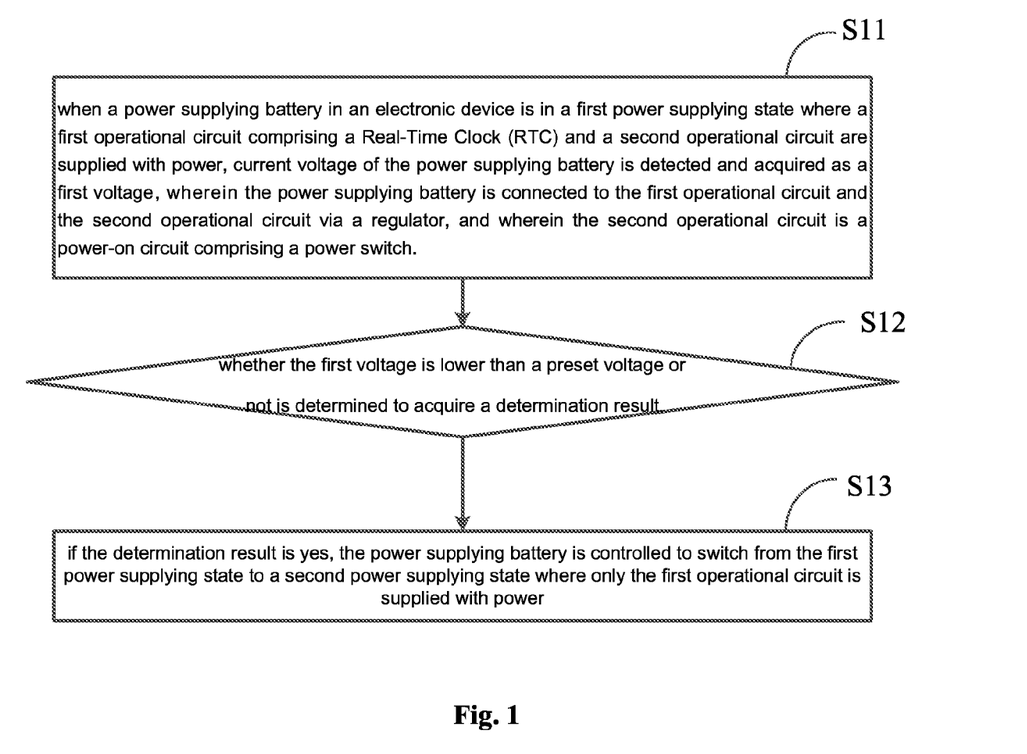
FIG. 1 is a main flow chart showing a power supplying method according to an embodiment of the present disclosure.

As shown in FIG. 1, a power supplying method according to an embodiment of the present disclosure is disclosed. The method comprises steps of:

S11: when a power supplying battery in an electronic device is in a first power supplying state where a first operational circuit comprising a Real-Time Clock (RTC) and a second operational circuit are supplied with power, current voltage of the power supplying battery is detected and acquired as a first voltage. The power supplying battery is connected to the first operational circuit and the second operational circuit via a regulator. The second operational circuit is a power-on circuit comprising a power switch. Optionally, in some embodiments, the first operational circuit may comprise other circuits besides the RTC, such as a switching circuit of MOS transistors.

S12: whether the first voltage is lower than a preset voltage or not is determined to acquire a determination result.

S13: if the determination result is yes, the power supplying battery is controlled to switch from the first power supplying state to a second power supplying state where only the first operational circuit is supplied with power.

In the embodiment of the present disclosure, in the step S11, the power supplying battery may be a rechargeable battery provided in the electronic device, such as a Lithium-ion battery. When the electronic device is connected to a power adaptor, this power supplying battery may be charged via the power adaptor. When the electronic device is not connected to a power adaptor, various operational circuits in the electronic device may be supplied with power by this power supplying battery, to facilitate the user in using this electronic device in various circumstances.

To be specific, the first operational circuit may be a circuit in the electronic device comprising a Real-Time Clock, that is, an RTC circuit. Typically, a Real-Time Clock is a pulse generated by a clock circuit composed of a crystal oscillator and related circuits on the PC mother board in the electronic device. The RTC generates a system clock TSC having a lower frequency after the frequency conversion by the circuit. The system clock is incremented by 1 for each machine cycle, and the system clock is initialized by the RTC for each time when the system is booted. In the electronic device, the Real-Time Clock is used for providing a stable clock signal to subsequent circuits in the electronic device for use. For example, possible functions may comprise: a clock, a calendar, an alarm clock, periodic interrupt output, a 32 KHz clock output, or the like.

In practice, in addition to the RTC circuit, the first operational circuit may further comprise other basic circuits required by the electronic device, for example, a circuit for detecting insertion of an power adaptor and for awaking other circuits, such as a power-on circuit, and beginning to charge the power supplying battery when it is detected that the power adaptor is inserted.

Typically, the second operational circuit may be the power-on circuit in the electronic device. The power-on circuit is a circuit in a mother board, and its main purpose is to control the power management chip, such as, switching on the power management chip to output operating voltage, supplying various circuits of the notebook with power, and then causing the notebook to operate.

Typically, the power-on circuit of the mother board is triggered via the power switch. After the trigger signal is processed by the south-bridge chip or the power-on controlling chip in the power-on circuit, a control signal is finally issued. The control signal triggers the power supplying circuit to operate, such that the power supplying circuit outputs respective operating voltages to circuits at each stage to supply the circuits with operating voltages.

In practice, the operating voltages for the RTC circuit and the power-on circuit are usually 3V.

Alternatively, in an embodiment of the present disclosure, a power switch may be provided in the second operational circuit, and the power switch may be used for detecting the current voltage of the power supplying battery. Therefore, the step S11 may further comprise: the power switch in the second operational circuit is controlled to detect and acquire a first voltage currently corresponding to the power supplying battery. Further, the power switch is connected directly to the power supplying battery via a third operational circuit, and the power switch is located between the power supplying battery and the power-on circuit.

Figure 2:
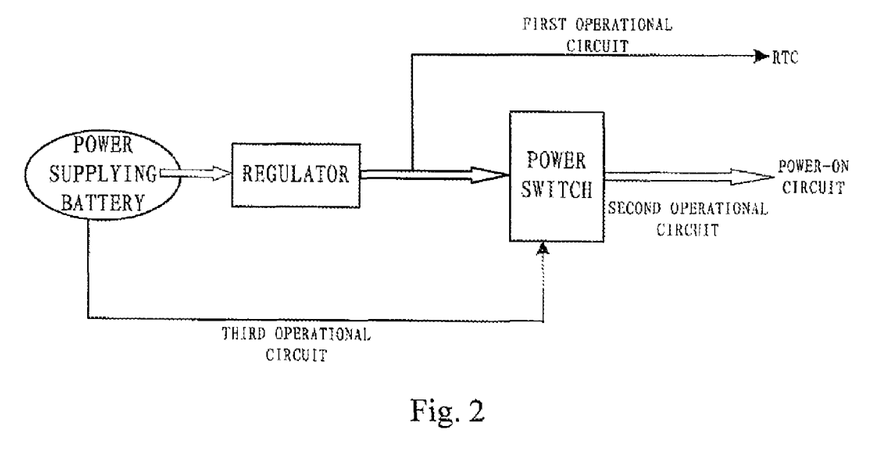
FIG. 2 is a circuit schematic diagram illustrating a power supplying battery connecting circuit according to an embodiment of the present disclosure.

As shown in FIG. 2, it is a connection schematic diagram illustrating a connection between a power supplying battery and operational circuits according to an embodiment of the present disclosure. The first operational circuit and the second operational circuit are connected to the power supplying battery via a regulator. The power switch is located between the second operational circuit and the regulator, and the power switch is directly connected to the power supplying battery via a third operational circuit in order to facilitate in detecting the current voltage (i.e. the first voltage) of the power supplying battery when in the first power supplying state.

Next, proceeding to S12, it is determined whether the acquired first voltage is lower than a preset voltage which is a minimum voltage with which the power supplying battery may be able to supply the electronic device for normal operations, that is, power-on voltage.

For example, if this power supplying battery is a Lithium-ion battery, due to the definition of discharging capability of a Lithium-ion battery, its minimum operating voltage is down to 3.7 V and its voltage in a fully charged state is 4.2V. Therefore, the preset voltage may be set as 3.7V. Based thereon, by determining whether the first voltage is lower than the preset voltage, it can be determined whether the current voltage of the power supplying battery can keep supplying the operational circuits with operating voltages.

In the step S13, the determination result indicates that the first voltage is lower than the preset voltage, that is, the current voltage of the power supplying battery is lower than the power-on voltage. At the time, the residual power of the power supplying battery is not sufficient enough to supply the electronic device with a normal operating power, and the power for the power-on circuit is required to be switched off and the power supplying state is switched to a second power supplying state where only the first operational circuit comprising the RTC circuit is supplied with power.

Typically, in the case where one cell of the power supplying battery in the electronic device is able to supply the notebook computer with power, its voltage is required to be higher than 3V. In other words, after the first full charging, the power supplying battery of the notebook computer has a voltage of 3V when its capacity is discharged to 0. Although the capacity is shown as 0, it still has a high battery capacity relative to the power required by the RTC circuit.

In practice, one cell in the power supplying battery in the electronic device has a voltage of 3V when its capacity is discharged to 0 for the first time. After testing, in this situation, the period during which the power supplying battery may be discharged constantly is 31 days with a current of 1.5 mA. Typically, there are at least 3 cells provided in the electronic device. If it is required to have enough residual power supplied to the RTC circuit for one year when the notebook's capacity is discharged to 0 after the first full charging, the discharge current is required to be less than 370 µA. The RTC circuit only requires a current of 2 µA to operate normally. Therefore, after the power supplying state of the electronic device is switched to the second power supplying state, the residual power in the power supplying battery may be utilized to keep supplying the RTC circuit with power for a long time, thereby ensuring that a normal clock information or the like may be acquired when the electronic device is connected to the power adaptor and powered on.

Alternatively, in an embodiment of the present disclosure, in the step S13, to control the electronic device to switch the power supplying state, if the first voltage is lower than the preset voltage, the power switch is controlled to switch off the operating voltage for the second operational circuit and the power supplying state for the power supplying battery is switched from the first operating state to the second power supplying state. In other words, if it is detected by the power switch of the third operational circuit that the first voltage of the power supplying battery is lower than the preset power-on voltage, the operating power for the second operational circuit is switched off by this power switch. For example, when it is detected that the voltage of the Lithium battery is lower than 3.7V, the power for the power-on circuit of 3V is switched off by this power switch, and only the RTC circuit of 3V is supplied with power.

In an embodiment of the present disclosure, by optimizing the circuits, when it is detected that the first voltage of the power supplying battery is lower than the preset minimum power-on voltage, the power switch switches off the path for supplying power to other devices and power is supplied only to the first operational circuit comprising the RTC circuit. Since the current required by the RTC circuit is less and power consumption is low, it may operate independently for at least one year without power-on of the electronic device and without a connection to a power adaptor. Therefore, it is not required to install an RTC battery in the notebook computer separately, such that the internal structure of the electronic device is simple, and no hardware cost is increased by this method and the cost for manufacturing the electronic device is reduced.

Alternatively, in an embodiment of the present disclosure, if it is detected that the first voltage is lower than the preset voltage, the second operational circuit may be further controlled to be in a dormant mode, so as to switch the power supplying battery from the first power supplying state to a second power supplying state where only the first operational circuit is supplied with power.

In practice, the controlling of the second operational circuit to be in a dormant mode may refer to set the Embedded Controller (EC) into a dormant state, to optimize the embedded chips, and the EC switched off the internal clock and calculating units.

In particular, when the EC is optimized, the method further comprises: at least one general purpose input/output port that is in an idle state in the second operational circuit is detected and determined; the electronic device is controlled to switch off the at least one general purpose input/output port, and operating mode of a power detecting pin in the second operational circuit is set into an interrupt mode.

In other words, all unused GPIOs (General Purpose Input Output) are switched off, and the detection pin for detecting AC and the detection pin of the power supply are set into an interrupt mode. In this way, the management chip is not required to query the signal states of these two pins repeatedly and power may be saved. For example, a latest power-on circuit from NuvoTon Technology may have a minimum power consumption of 100 µA.

In practice, by software optimization, in the second power supplying state, the power supplying battery supplies the first operational circuit with power in a normal manner. After the EC is set to be in the dormant mode, the adjusted EC current may be measured and it can be determined whether to continue and adjust related EC parameters based on the measured value of the current.

Alternatively, in an embodiment of the present disclosure, after the power supplying state of the electronic device is switched to the second power supplying state, the method further comprises:

1) the power switch is controlled to detect, through the third operational circuit, whether there is an alternating current (AC) power signal that is input to the electronic device, so as to acquire a second determination result; and 2) if the second determination result indicates so, the power supplying battery is controlled to supply the second operational circuit with power.

The circuit for detecting the AC signal may be a basic detection circuit connected to the first operational circuit. When the electronic device is connected to the power adaptor, the AC signal is detected. At the time, the power switch does not work, and the system resume power supplying to the second operational circuit and therefore it may be powered on.

In the embodiment of the present disclosure, since the power consumption of the power-on circuit in the dormant mode is about 200 µA in the second power supplying state by software optimization, the power-on circuit and the RTC circuit may meet the requirement of 370 µA or less, and it is achievable that the RTC circuit may be supplied with power for at least one year by using the residual power of the power supplying battery. In this way, the RTC circuit may be supplied with power by the power supplying battery, while partial components in the power-on circuit in the dormant mode may also be supplied with power, thereby maintaining a longer discharging state and improving the utilization of the power supplying battery.

Based on the same inventive concept, the present disclosure further provides a power supplying system mainly comprising a power supplying battery, a regulator, a first operational circuit, and a second operational circuit.

To be specific, the power supplying battery in the system is configured to supply the electronic device with the power supply voltage. In practice, this power supplying battery may be a rechargeable battery provided in the electronic device, such as a Lithium-ion battery. Typically, when the electronic device is connected with a power adaptor, this power supplying battery may be charged by the power adaptor. When it is not connected to a power adaptor, various operational circuits in the electronic device may be charged by this charging battery, thereby facilitating the user in using the electronic device in various circumstances.

The regulator is connected to the power supplying battery and configured to convert the power supply voltage into a stable operating voltage. The first operational circuit and the second operational circuit are connected to the power supplying battery via the regulator.

In the embodiment of the present disclosure, the first operational circuit is connected to a Real-Time Clock (RTC) circuit, and the second operational circuit is connected to a power-on circuit. In other words, the first operational circuit may be a circuit of the electronic device comprising the Real-Time Clock, that is, an RTC circuit used for providing a stable clock signal to subsequent circuits in the electronic device.

In practice, in addition to the RTC circuit, the first operational circuit may further comprise other basic circuits in the power supplying system, for example, a circuit for detecting insertion of an power adaptor and awaking other circuits, such as a power-on circuit, and beginning to charge the power supplying battery when it is detected that the power adaptor is inserted.

The second operational circuit may be a circuit comprising at least the power-on circuit in the power supplying system. The power-on circuit is a circuit in a mother board, and its main purpose is to control the power management chip, such as, switching on the power management chip to output operating voltage, supplying various circuits of the notebook with power, and then causing the notebook to operate.

In practice, the operating voltages for the RTC circuit and the power-on circuit are usually 3V.

Alternatively, in an embodiment of the present disclosure, the second operational circuit may further comprise a power switch located between the power supplying battery and the power-on circuit. The power switch is connected to the second end of the third operational circuit, and the first end of the third operational circuit is directly connected to the power supplying battery. Please refer to the connection structure shown in FIG. 2.

Alternatively, in an embodiment of the present disclosure, when it is detected that a first current voltage for the power supplying battery is lower than a preset voltage, the power supplying battery is controlled to switch from a first power supplying state to a second power supplying state where only the first operational circuit is supplied with power. In the first power supplying state, the first operational circuit and the second operational circuit are supplied with power by the power supplying battery. The preset voltage may be the minimum voltage that is supplied by the power supplying battery for the electronic device to operate in a normal manner, that is, the power-on voltage.

Alternatively, in an embodiment of the present disclosure, when the power switch detects, through the third operational circuit, the current voltage of the power supplying battery is lower than a preset voltage, the power switch is able to switch off the operating voltage for the second operational circuit and to control the electronic device to switch the power supplying state to the second power supplying state.

In other words, when it is detected by the power switch of the third operational circuit that the first voltage of the power supplying battery is lower than the preset power-on voltage, the operating power for the second operational circuit is switched off by this power switch. For example, when it is detected that the Lithium battery has a battery voltage lower than 3.7V, the power for the power-on circuit of 3V is switched off by the power switch, and only the RTC circuit of 3V is supplied with power.

Figure 3:
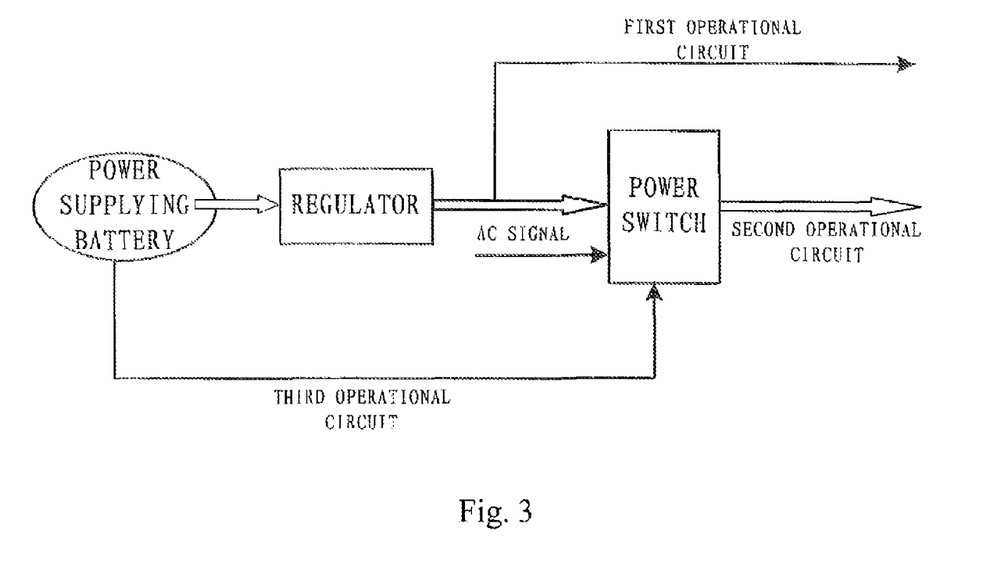
FIG. 3 is a main circuit schematic diagram showing a power supplying system according to an embodiment of the present disclosure.

In practice, when the power supplying battery in the power supplying system is in the second power supplying state, if the electronic device is connected to the power adaptor, the presence of the AC signal can be detected, as shown in FIG. 3. At the time, the power switch does not work, and the power supplying system supplies the second operational circuit with power.

Typically, in the case where one cell of the power supplying battery in the electronic device is able to supply the notebook computer with power, its voltage is required to be higher than 3V. In other words, after the first full charging, the power supplying battery of the notebook computer has a voltage of 3V when its capacity is discharged to 0. Although the capacity is shown as 0, it still has a high battery capacity relative to the power required by the RTC circuit.

In practice, one cell in the power supplying battery in the electronic device has a voltage of 3V when its capacity is discharged to 0 for the first time. After testing, in this situation, the period during which the power supplying battery may be discharged constantly is 31 days with a current of 1.5 mA. Typically, there are at least 3 cells provided in the electronic device. If it is required to have enough residual power supplied to the RTC circuit for one year when the notebook's capacity is discharged to 0 after the first full charging, the discharge current is required to be less than 370 μA. The RTC circuit only requires a current of 2 μA to operate normally. Therefore, after the power supplying state of the electronic device is switched to the second power supplying state, the residual power in the power supplying battery may be utilized to keep supplying the RTC circuit with power for a long time, thereby ensuring that a normal clock information or the like may be acquired when the electronic device is connected to the power adaptor and powered on.

In an embodiment of the present disclosure, by optimizing the circuits, when it is detected that the first voltage of the power supplying battery is lower than the preset minimum power-on voltage, the power switch switches off the path for supplying power to other devices and power is supplied only to the first operational circuit comprising the RTC circuit. Since the current required by the RTC circuit is less and power consumption is low, it may operate independently for at least one year without power-on of the electronic device and without a connection to a power adaptor. Therefore, it is not required to install an RTC battery in the notebook computer separately, such that no cost in hardware is increased by this method and the cost for manufacturing the electronic device is reduced.

Alternatively, in an embodiment of the present disclosure, the second operational circuit further comprises at least one input/output interface, that is GPIO interface. When the power supplying battery is in the second power supplying state, the at least one GPIO is in the off state. Meanwhile, the detection pin for detecting AC signals and the detection pin of the power supply may be set into an interrupt mode. In this way, it is not required to query the signal states of these two pins repeatedly. The power consumption may be saved and the battery utilization of the power supplying battery may be improved.

Based on the same inventive concept, an embodiment of the present disclosure further provides an electronic device comprising the above described power supplying system. Since the first operational circuit comprising RTC is connected to the power supplying battery, even when it is detected that the first voltage of the power supplying battery is lower than the power-on voltage, the electronic device may be controlled to switch the power supplying state to the second power supplying state where the first operational circuit is still supplied with power. This could be achieved only by optimizing the circuit, and no additional RTC battery is disposed in the electronic device. In this way, a portion of hardware is reduced, and the internal space utilization of the electronic device is improved.

To be specific, the main improvement in the electronic device, that is, the power supplying system, is already described in details hereinbefore, and the description thereof is omitted here for simplicity.

In an embodiment of the present disclosure, when the electronic device is in the first power supplying state, the power supplying battery supplies the first operational circuit comprising the Real-Time Clock (RTC) and the second operational circuit with power, and the electronic device may operate in a normal operating state. By detecting the first current voltage of the power supplying battery and determining whether the first voltage is lower than the preset voltage or not, it can be determined that the residual power of the power supplying battery is low if it is determined to be lower than the preset voltage, and in this case, the power supplying to other circuits is switched off and the power supplying state is switched to the second power supplying state where only the first operational circuit is supplied with power. Since the first operational circuit comprising the RTC is connected to the power supplying battery and the power required by the RTC circuit is less, the residual power may keep supplying this circuit with power for a long time even if the voltage of the power supplying battery is lower than the preset voltage. Therefore, the RTC circuit may be supplied with power by the electronic device's own power supplying battery without an additional button cell that occupies the internal space of the electronic device to supply the RTC circuit with power, while the internal structure of the electronic device is simplified and the cost for manufacturing the electronic device is reduced.

To be specific, computer program instructions corresponding to the power supplying method according to an embodiment of the present disclosure may be stored on a storage medium, such as, an optical disk, a hard disk, or a flash memory. When the computer program instruction corresponding to the power supplying method stored in the storage medium is read or executed by an electronic device, it comprises steps of: when a power supplying battery in the electronic device is in a first power supplying state where a first operational circuit comprising a Real-Time Clock (RTC) and a second operational circuit are supplied with power, current voltage of the power supplying battery is detected and acquired as a first voltage, wherein the power supplying battery is connected to the first operational circuit and the second operational circuit via a regulator, and wherein the second operational circuit is a power-on circuit comprising a power switch; whether the first voltage is lower than a preset voltage is determined to acquire a determination result; and the power supplying battery is controlled to switch from the first power supplying state to a second power supplying state where only the first operational circuit is supplied with power if the determination result is yes.

Alternatively, the computer instruction stored in the storage medium corresponding to the step of detecting and acquiring current voltage of the power supplying battery as a first voltage, when executed, further comprises steps of: the power switch in the second operational circuit is controlled to detect and acquire a first voltage currently corresponding to the power supplying battery, wherein the power switch is connected directly to the power supplying battery via a third operational circuit, and the power switch is located between the power supplying battery and the power-on circuit.

Alternatively, the computer instruction stored in the storage medium corresponding to the step of controlling the power supplying battery to switch from the first power supplying state to a second power supplying state where only the first operational circuit is supplied with power if the determination result is yes, when executed, further comprises steps of: the power switch is controlled to switch off the operating voltage for the second operational circuit and switching the power supplying state for the power supplying battery from the first operating state to the second power supplying state if the determination result indicates that the first voltage is lower than the preset voltage.

Alternatively, the computer instruction stored in the storage medium corresponding to the step of controlling the power supplying battery to switch from the first power supplying state to a second power supplying state where only the first operational circuit is supplied with power if the determination result is yes, when executed, further comprises steps of: the second operational circuit is controlled to be in a dormant mode if the determination result is yes; and the power supplying battery is switched from the first power supplying state to a second power supplying state where only the first operational circuit is supplied with power.

Alternatively, some other computer instructions are stored in the storage medium, and while the computer instruction corresponding to the step of controlling the second operational circuit to be in a dormant mode if the determination result is yes is executed, these computer instructions further comprises steps of: at least one general purpose input/output port that is in an idle state in the second operational circuit is detected and determined; the electronic device is controlled to switch off the at least one general purpose input/output port, and operating mode of a power detecting pin in the second operational circuit is set into an interrupt mode.

Alternatively, some other computer instructions are stored in the storage medium, and while the computer instruction corresponding to the step of controlling the power supplying battery to switch from the first power supplying state to the second power supplying state where only the first operational circuit is supplied with power, these computer instructions further comprises steps of: the power switch is controlled to detect, through the third operational circuit, whether there is an alternating current (AC) power signal that is input to the electronic device, so as to acquire a second determination result; the power supplying battery is controlled to supply the second operational circuit with power if the second determination result indicates there is an AC power signal that is input to the electronic device.

Obviously, one skilled in the art could make various modifications and variations to the present disclosure without departing from the spirit and scope of the present disclosure. In this way, if these modifications and variations of the present disclosure fall into the scope of the claims of the present disclosure and their full equivalents, then the present disclosure is intended to cover these modifications and variations.

What is claimed:

1. A power supplying method, comprising:
    detecting current voltage of a power supplying battery in an electronic device when the power supplying battery is in a first power supplying state where a first operational circuit comprising a Real-Time Clock (RTC) and a second operational circuit are both supplied with power, wherein the power supplying battery is connected to the first operational circuit and the second operational circuit via a regulator, and wherein the second operational circuit is a power-on circuit comprising a power switch;
    determining whether the detected current voltage is lower than a preset voltage; and
    controlling the second operational circuit to enter into a dormant mode and switching the power supplying battery from the first power supplying state to a second power supplying state where only the first operational circuit is supplied with power when it is determined that the detected current voltage is lower than the preset voltage,
    wherein the controlling the second operational circuit to enter into the dormant mode comprises:
    detecting at least one general purpose input/output port in the second operational circuit which is in an idle state; and
    controlling the electronic device to switch off the at least one general purpose input/output port, and setting an operating mode of a power detecting pin in the second operational circuit into an interrupt mode in which a state of the power detecting pin is not queried repeatedy.

2. The method according to claim 1, wherein detecting current voltage of the power supplying battery comprises:
    controlling the power switch in the second operational circuit to detect the current voltage of the power supplying battery, wherein the power switch is connected to the power supplying battery via a third operational circuit.

3. The method according to claim 2, wherein controlling the power supplying battery to switch from the first power supplying state to a second power supplying state where only the first operational circuit is supplied with power when it is determined that the detected current voltage is lower than the preset voltage comprises:
    controlling the power switch to switch off the operating voltage for the second operational circuit and switching the power supplying state for the power supplying battery from the first power supplying state to the second power supplying state when it is determined that the detected current voltage is lower than the preset voltage.

4. The method according to claim 1, further comprising:
    controlling the power switch to detect, through a third operational circuit, whether there is an alternating current (AC) power signal that is inputted into the electronic device; and
    controlling the power supplying battery to supply the second operational circuit with power when there is the AC power signal that is inputted into the electronic device.

5. A power supplying system, comprising:
    a power supplying battery configured to supply the electronic device with the power supply voltage;
    a regulator connected to the power supplying battery and configured to convert the power supply voltage into a stable operating voltage;
    a first operational circuit and a second operational circuit connected to the power supplying battery via the regulator, the first operational circuit comprising a Real-Time Clock (RTC) circuit, and the second operational circuit being a power-on circuit,
    wherein the power supplying battery is controlled to switch from a first power supplying state to a second power supplying state when it is detected that a current voltage of the power supplying battery is lower than a preset voltage, where in the first power supplying state, the first operational circuit and the second operational circuit are both supplied with power, while in the second power supplying state, only the first operational circuit is supplied with power, and
    wherein the second operational circuit further comprises at least one input/output interface and a power detecting pin, and the at least one input/output interface is in an off state and an operating mode of the power detecting pin is in an interrupt mode in which a state of the power detecting pin is not queried repeatedly when the power supplying battery is in the second power supplying state.

6. The system according to claim 5,
    wherein the second operational circuit further comprises a power switch, wherein the power switch is connected to a second end of a third operational circuit and is configured to detect the current voltage of the power supplying battery, and
    wherein a first end of the third operational circuit is directly connected to the power supplying battery.

7. The system according to claim 6, wherein the power switch is able to switch off the operating voltage for the second operational circuit when the power switch detects, through the third operational circuit, that the current voltage of the power supplying battery is lower than a preset voltage.

8. An electronic device comprising a power supplying system, the power supplying system comprising:
    a power supplying battery configured to supply the electronic device with the power supply voltage;
    a regulator connected to the power supplying battery and configured to convert the power supply voltage into a stable operating voltage;
    a first operational circuit and a second operational circuit connected to the power supplying battery via the regulator, the first operational circuit comprising a Real-Time Clock (RTC) circuit, and the second operational circuit being a power-on circuit,
    wherein the power supplying battery is controlled to switch from a first power supplying state to a second power supplying state when it is detected that a current voltage of the power supplying battery is lower than a preset voltage, where in the first power supplying state, the first operational circuit and the second operational circuit are both supplied with power, while in the second power supplying state, only the first operational circuit is supplied with power, and wherein the second operational circuit further comprises at least one input/output interface and a power detecting pin, and the at least one input/output interface is in an off state and an operating mode of the power detecting pin is in an interrupt mode in which a state of the power detecting pin is not queried repeatedly when the power supplying battery is in the second power supplying state.

* * * * *